United States Patent [19]

Boppe et al.

[11] 4,382,569
[45] May 10, 1983

[54] WING TIP FLOW CONTROL

[75] Inventors: Charles W. Boppe, Farmingdale; Stuart G. Harvie, Bay Shore, both of N.Y.

[73] Assignee: Grumman Aerospace Corporation, Bethpage, N.Y.

[21] Appl. No.: 106,717

[22] Filed: Dec. 26, 1979

[51] Int. Cl.³ .................. B64C 23/00; B64C 21/02
[52] U.S. Cl. .................................... 244/199; 244/208
[58] Field of Search .............................. 244/198-200, 244/87, 91, 204, 207-209, 130

[56] References Cited

U.S. PATENT DOCUMENTS

| | | | |
|---|---|---|---|
| 2,075,817 | 4/1937 | Loerke | 244/199 |
| 2,453,721 | 11/1948 | Mercier | 244/207 |
| 2,751,168 | 6/1956 | Stalker | 244/209 X |
| 2,833,492 | 5/1958 | Fowler | 244/209 |
| 2,867,392 | 1/1959 | Lear | 244/42 |
| 2,894,703 | 7/1959 | Hazen et al. | 244/209 X |
| 3,000,401 | 9/1961 | Ringleb | 244/200 X |
| 3,149,804 | 9/1964 | Litz, Jr. | 244/209 |
| 3,149,805 | 9/1964 | Frey et al. | 244/208 |
| 3,411,738 | 11/1968 | Sargent | 244/199 |
| 3,596,854 | 8/1971 | Haney, Jr. | 244/40 |
| 3,774,864 | 11/1973 | Hurkamp | 244/207 |
| 3,776,489 | 12/1973 | Wen et al. | 244/204 |
| 3,951,360 | 4/1976 | Anxionnaz | 244/209 |
| 3,974,986 | 8/1976 | Johnstone | 244/199 |
| 3,997,132 | 12/1976 | Erwin | 244/40 R |
| 4,205,810 | 6/1980 | Ishimitsu | 244/199 |

FOREIGN PATENT DOCUMENTS 1564026  3/1969  France ...................... 244/199

Primary Examiner—Galen L. Barefoot
Attorney, Agent, or Firm—Richard G. Geib

[57] ABSTRACT

A capture device at the tip of a fluid foil such that when the foil has relative motion with respect to fluid in which it is immersed the capture device intercepts a quantity of the crossflow which is generated by the difference in pressure on the lower surface relative to the upper surface so that lift-induced drag is reduced thereby. The capture device comprises a curved plate having its concave side facing inward toward the foil center span to form an inlet, and an aspirating device for venting off the lower surface crossflow inducted by the capture device. Conventional pumping can be used to aspirate the capture device or a winglet having a passage connecting the capture inlet with a slot opening on a low pressure region of the winglet can be utilized for the purpose.

4 Claims, 10 Drawing Figures

FREESTREAM FLOW

LOWER SURFACE CROSSFLOW

TIP VORTEX

PRIOR ART

TIP VORTEX

DOWNWASH FIELD

WING TIP FLOW CONTROL

BACKGROUND OF THE INVENTION

1. Field of the Invention

This invention relates to fluid-foils and, more particularly, to aerodynamic means at the tips thereof for controlling and reducing tip vortices to thereby decrease lift-induced drag.

2. Description of the Prior Art

As is well-known, fluid foils, are shaped or positioned such that, when they have relative motion with respect to a fluid in which they are immersed, the fluid travels faster over the upper surface than over the lower surface. This produces a lower pressure on the upper surface that generates lift. An airfoil, such as an aircraft wing of finite length, has a tip end presenting a path for fluid from the higher pressure region on the bottom surface of the wing to flow toward the lower pressure region on the top surface in a relatively stable vortex flow. Such vortex flow degrades flight efficiency by reducing lift while increasing drag on the aircraft. Further, the wing and wing tip flow pattern establishes a pair of trailing vortices which remain undissipated for extended periods of time, posing serious flight hazard for following aircraft and for aircraft crossing the region of such vortices. Typically, a time spacing of three minutes or more is provided between take-offs and landings of aircraft to permit dissipation of the vortices, thereby contributing to delays in airport operations. If the airfoil is used as the blade or the wing of a rotary-wing aircraft, substantial loading and rotor noise are generated as the blade passes through the vortices created by a preceding blade.

Prior attempts to overcome, deflect, or dissipate the adverse effects of wing tip vortices have been made, but have been subject to disadvantages and limitations. Several prior art constructions for the purpose are disclosed by A. W. Loerke, U.S. Pat. No. 2,075,817. Each Loerke construction has a disadvantage or limitation; however, such as a requirement for a venturi tube open at the wing tip, creating air resistance in flight; or a requirement for a suction pump to draw air from the wing tip and through the wing; or for a requirement for an external structure appended at the trailing edge of each wing tip. The requirement for a drag-inducing pod-like body at each wing tip is also a disadvantage in the constructions disclosed by W. R. Haney, Jr., in U.S. Pat. No. 3,596,854. The complexity and added cost of the jet engines used to control tip vortices militates against the benefits of the design disclosed by J. R. Erwin, U.S. Pat. No. 3,997,132.

Investigators have also explored the possibility of reducing drag below that given by optimum wing sections (minimum friction and wave drag) and an elliptic span load (minimum conventional lift-induced drag) by using laminar flow control (LFC) and various types of winglets. The implementation of these technologies is hindered by many practical considerations. The anticipated 25% friction drag reduction attributed to LFC may not be sufficient to offset the power requirements, weight penalties, and the problems of system maintenance occasioned by the use of the technique. Similarly, the 4–10% winglet drag reduction, which is very configuration dependent, is somewhat compromised by the added drag and structural weight penalties of the winglets themselves. As a result, industry acceptance of these technologies has been slow.

Control of the wing tip flow has also been effected by shaping the wing tip to produce a simple end plate effect. Such a down-turned wing tip has the effect of inhibiting or altering the lower surface crossflow of the wing. This, in turn, weakens or modifies the wing tip vortex which effects the induced drag created by the wing downwash field. A design of this type taught by W. E. Sargent in U.S. Pat. No. 3,411,738 was incorporated in a Fairchild A-10 aircraft and resulted in a measure of drag reduction; however, it is seen that a drooped wing tip involves wing tip vortex deflection rather than a cross-flow capture and removal which is the principle by which the subject invention operates.

A drooped-tip wing which does have a provision therein for crossflow capture and removal is disclosed by E. H. Johnstone, U.S. Pat. No. 3,974,986. It has been found, however, that the design of the wing tip capture surface is critical for the successful operation of the concept. With the wing tip designs taught by Sargent and Johnstone, experiments have shown that while a small end-plating effect was observed, the suction or flow removal was substantially negligible. In addition, the design disclosed by Johnstone requires modifications to the structure of the wing itself. Since the cost and weight penalties required by such modifications are high, the practicality of the design suffers thereby.

SUMMARY OF THE INVENTION

FIGS. 1 and 2 illustrate the flowfield at the tip of a foil, such as a wing, having relative motion with respect to a fluid stream. Differences in wing upper and lower surface pressures create an outward crossflow over the wing lower surface in the region of the wing tip. The vortex generated at the wing tip is in part fed by the combination of this crossfield flow with the freestream flow. In this invention a vented surface which is curved inwardly such that its edge extends inside the tip of the wing is used to capture a portion of this crossflow distribution before it interacts with the freestream flow. Sufficient crossflow is captured to weaken the tip vortex to decrease the amount of energy that the wing imparts to the free air, reducing drag. Venting of the curved surface to effect crossflow capture is preferably by the aerodynamic action of a hollow winglet which extends from the capture surface or mechanical suction pumping means can be employed.

It is thus a principal object of the invention to provide means to enhance aircraft performance by minimizing lift-induced aerodynamic drag and also reduce shed vorticity for improved landing operations.

It is another object of the invention to provide means to reduce the downwash field strength and the associated lift-induced drag of an aircraft by capturing at each wing tip and removing a portion of the wing lower surface crossflow such that the remaining or escaping crossflow which combines with the freestream flow forms a tip vortex that is significantly weaker than that generated at a conventional wing tip.

A further object of the invention is to provide aspirating means at each wing tip of an aircraft comprising a vented curved capture surface extending downwardly and inwardly of the wing tip and facing the region of lower surface crossflow such that an inlet for the effective capture of crossflow to thereby reduce lift-induced drag is formed.

Yet another object of the invention is to provide means to increase materially the dynamic efficiency of a fluid foil by reducing or controlling disturbances and vortices at the foil tips.

A yet further object of the invention is to provide simple and inexpensive means by which vortices generated at the wing tips of aircraft in flight can be reduced and controlled, which means use natural venting into a low-pressure region of the wing-body flow such that powered supplemental means to generate suction for crossflow capture are not required.

Still another object of the invention is to accomplish the foregoing objects in a practical, safe, and reliable manner.

Other and further objects of the invention will be obvious upon an understanding of the illustrative imbodiment about to be described, or will be indicated in the appended claims, and various advantages not referred to herein will occur to one skilled in the art upon employment of the invention in practice.

DESCRIPTION OF THE DRAWINGS

For the purpose of illustrating the invention, there is shown in the drawings the forms which are presently preferred; it should be understood, however, that the invention is not necessarily limited to the precise arrangements and instrumentalities shown.

DESCRIPTION OF THE PREFERRED EMBODIMENTS

Figure 1:
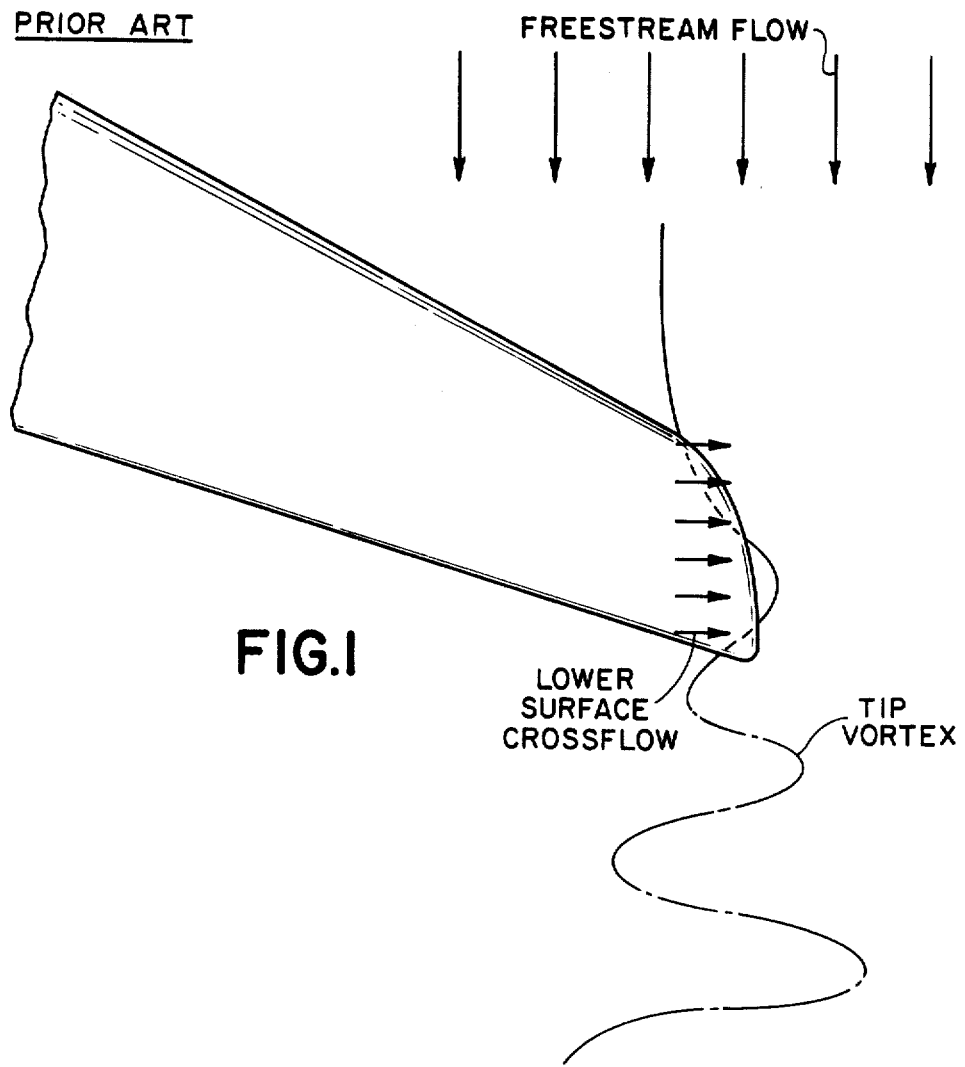
FIG. 1 is a fragmentary bottom plan view of a conventional airfoil showing the lower surface crossflow and the tip vortex induced thereby.
Figure 2:
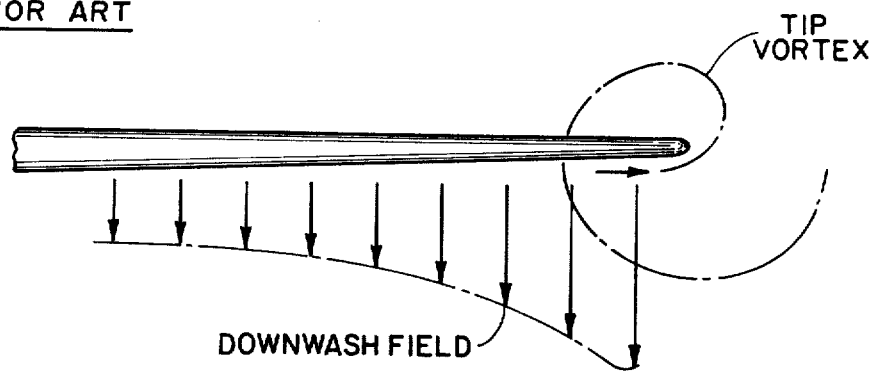
FIG. 2 is a fragmentary front elevational view of the airfoil of FIG. 1.

It is well known that for a lift-producing airfoil, such as a wing of infinite span, the flow pattern is identical at any particular point along the span. When the span is finite, however, there is a tip effect resulting from the movement of air from the lower to the upper surface of the wing. Because the pressure on the upper surface of the wing is negative (i.e. there is a lift-producing suction pressure) the air through which the wing passes attempts to flow so that the pressures on the lower and upper surfaces become equal. Since pressure on the lower surface of the wing is greater than that on the upper surface, flow will escape from below the wing at its tip and flow toward the upper surface, thus distorting the general flow about the foil, causing air to move inward over the upper surface of the wing and outward over the lower surface. As the fluid merges at the trailing edge of the wing, a surface of discontinuity which results in what is referred to as a "sheet of vortices" is created. Such a vortex sheet is unstable and the rotary motions contained therein combine to form two large vortices trailing from each tip of the wing. This phenomenon is illustrated in FIGS. 1 and 2. The circulations about the tip vortices induce a downwash or downward motion in the air passing over the wing and in so doing effect both the lift and the drag by changing the effective angle of attack. It is well known that a reduction in the strength of the tip vortices is an important factor in improving the aerodynamic performance of the wing by reducing lift-induced drag.

Figure 3:
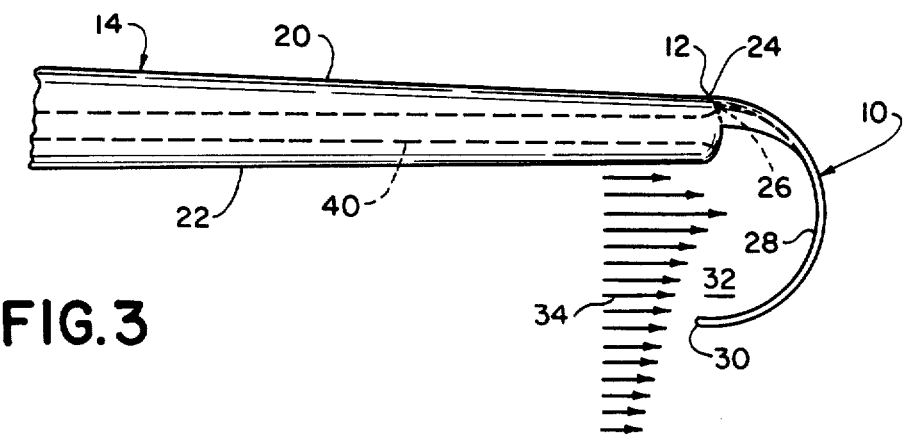
FIG. 3 is a fragmentary front elevational view of an airfoil embodying crossflow capture means of the invention.
Figure 4:
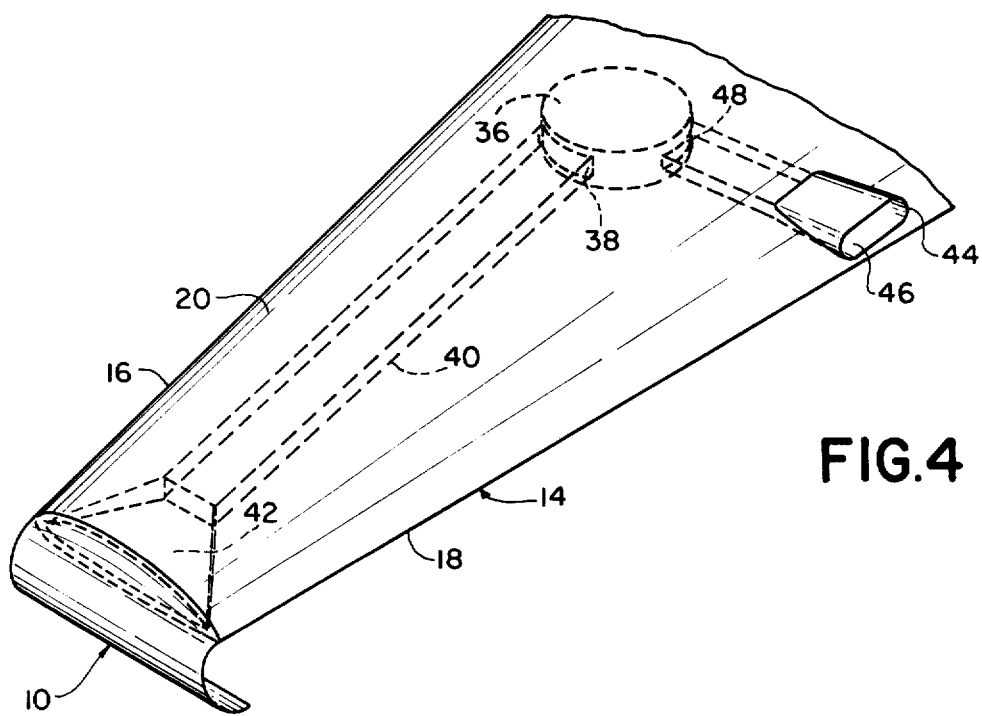
FIG. 4 is a fragmentary perspective view of the embodiment of FIG. 3.
Figure 5:
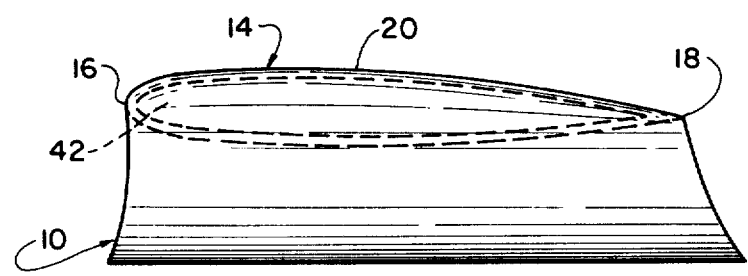
FIG. 5 is a side elevational view of the embodiment of FIG. 3.

The interception of a significant portion of the wing crossflow to thereby reduce the tip vortices is accomplished in this invention by aspirated capture means installed at the tip end of each wing. Although, for convenience of exposition, the invention is set forth as being used with the wing of an aircraft, it will be appreciated that there is no intention to limit the invention to use with an aircraft wing. The reference to an aircraft wing is to be understood to encompass any fluid foil such as propellers, helicopter blades, hydrofoils and other structures having relative motion with respect to a fluid. With reference now to FIGS. 3-5, the invention has a capture surface 10 mounted on the tip 12 of an aircraft wing 14. Wing 14 has the usual leading edge 16, trailing edge 18, upper surface 20, and lower surface 22. The capture surface 10, whose upper edge 24 is fixed to the wing tip 12 by any suitable means such as by welding 26 or riveting, is a structure of arcuate shape having its concave side 28 disposed inwardly facing the wing centerspan or root (not shown). The configuration of the invention, as perhaps best shown in the head-on view of FIG. 3, has the lower edge 30 of the capture surface extending inwardly to form an air inlet 32 which when suitably aspirated is highly efficient in inducing the crossflow (indicated by arrows 34) that is passing over the lower wing surface. The captured crossflow is aspirated by suitable means for venting elsewhere.

For example, a suction can be drawn on the region influenced by the capture surface 10 by means such as a suction pump 36 whose inlet 38 is connected to the capture region by a duct 40 and plenum 42 formed in the wing. The captured crossflow can be discharged out of a suitable outlet 44 connected by means of a duct 46 to the pump outlet 48. It will be appreciated, of course, that the main propulsion engine or engines of the aircraft can be employed instead of or in addition to pump 36 to aspirate the crossflow captured by surface 10.

Figure 6:
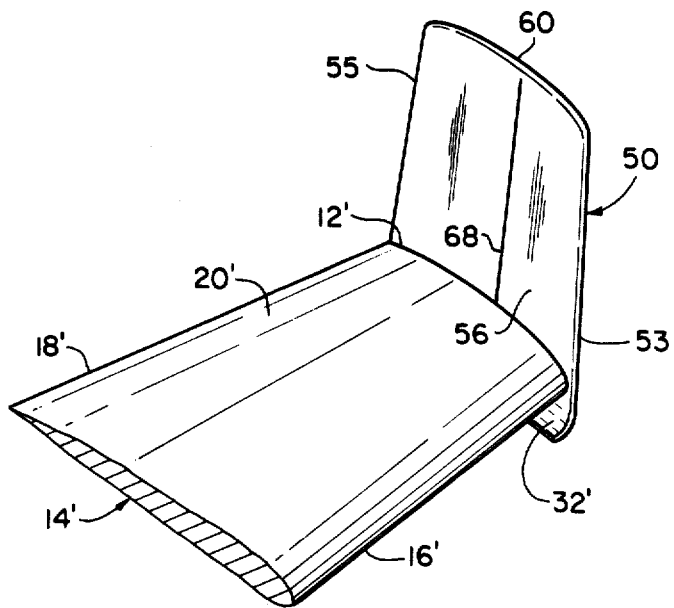
FIG. 6 is a fragmentary perspective view of a further embodiment of the crossflow capture means of the invention mounted on an airfoil.
Figure 8:
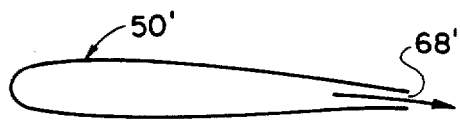
FIGS. 8 and 9 are sectional views of alternate sections of the winglet embodied in the invention.
Figure 9:
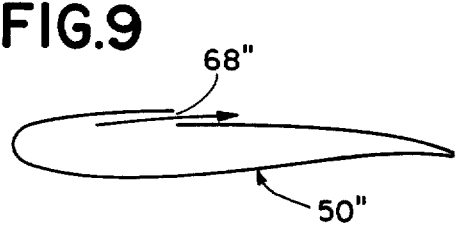
Figure 7:
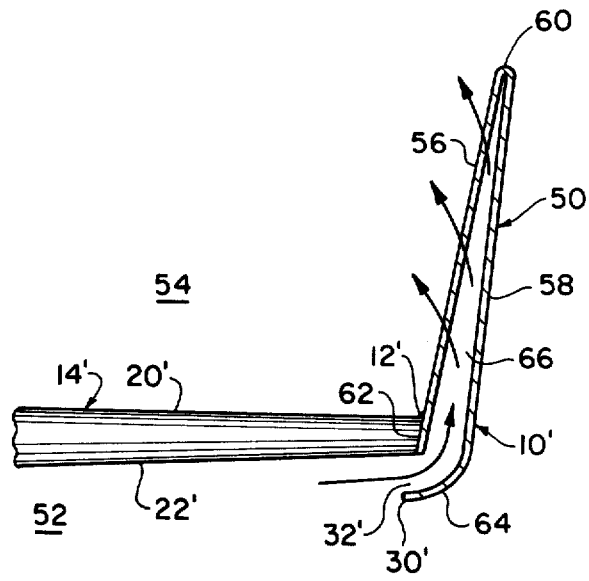
FIG. 7 is a fragmentary front elevational view partially in section of the embodiment of FIG. 6.

A preferred embodiment of this invention employs aerodynamic means to aspirate the flow captured by inlet 32 to thereby remove the captured wing tip crossflow. Such means preferably comprise a winglet or stub foil 50 suitably fixed on the tip 12' of an aircraft foil or wing 14' (see FIGS. 6 and 7). Wing 14' has the usual leading edge 16', trailing edge 18', upper surface 20' and lower surface 22'. In flight, as is the general characteristic of a suitably shaped and positioned foil having relative motion with respect to say an airmass, a high pressure region 52 will exist below the foil and a low pressure region 54 above the foil and "above" the winglet 50 ("above" being understood to mean the side of the winglet facing the upper, low pressure, surface 20' of the foil). As indicated by the winglet section shown in FIGS. 8 and 9, the winglet can be designed to have a section that will enhance the low pressure field 54, to aspirate the crossflow captured in the inlet or to serve any desired aerodynamic function. Winglet 50 has a leading edge 53, a trailing edge 55, an inside surface 56, (facing low-pressure field 54 of the wing), an outside surface 58, and an upper tip 60. The lower portion 62 of the winglet inside surface 56 is fastened as by riveting or welding to the tip 12' of the wing and the lower portion 64 of the outside surface 58 extends below the lower surface 22' of the wing 14' and is curved inwardly to form capture surface 10'. As with the capture surface 10 previously described; the lower edge 30' thereof extends inwardly to form a concave inlet 32' which effectively captures wing lower surface crossflow. In this embodiment, the inlet 32' opens into the hollow interior of the winglet forming a plenum 66 extending the height of the winglet. A suitable slot 68 in the inside surface 56 of the winglet opening on to a low-pressure region thereof is used to aspirate the plenum 66 and capture inlet 32' so as to draw off the wing undersurface crossflow intercepted by capture surface 10'. The slot used to vent the plenum of the winglet can be located in any suitable low pressure region (in flight) thereof such as slot 68' in the winglet 50' (FIG. 8) or slot 68'' in winglet 50'' (FIG. 9).

Figure 10:
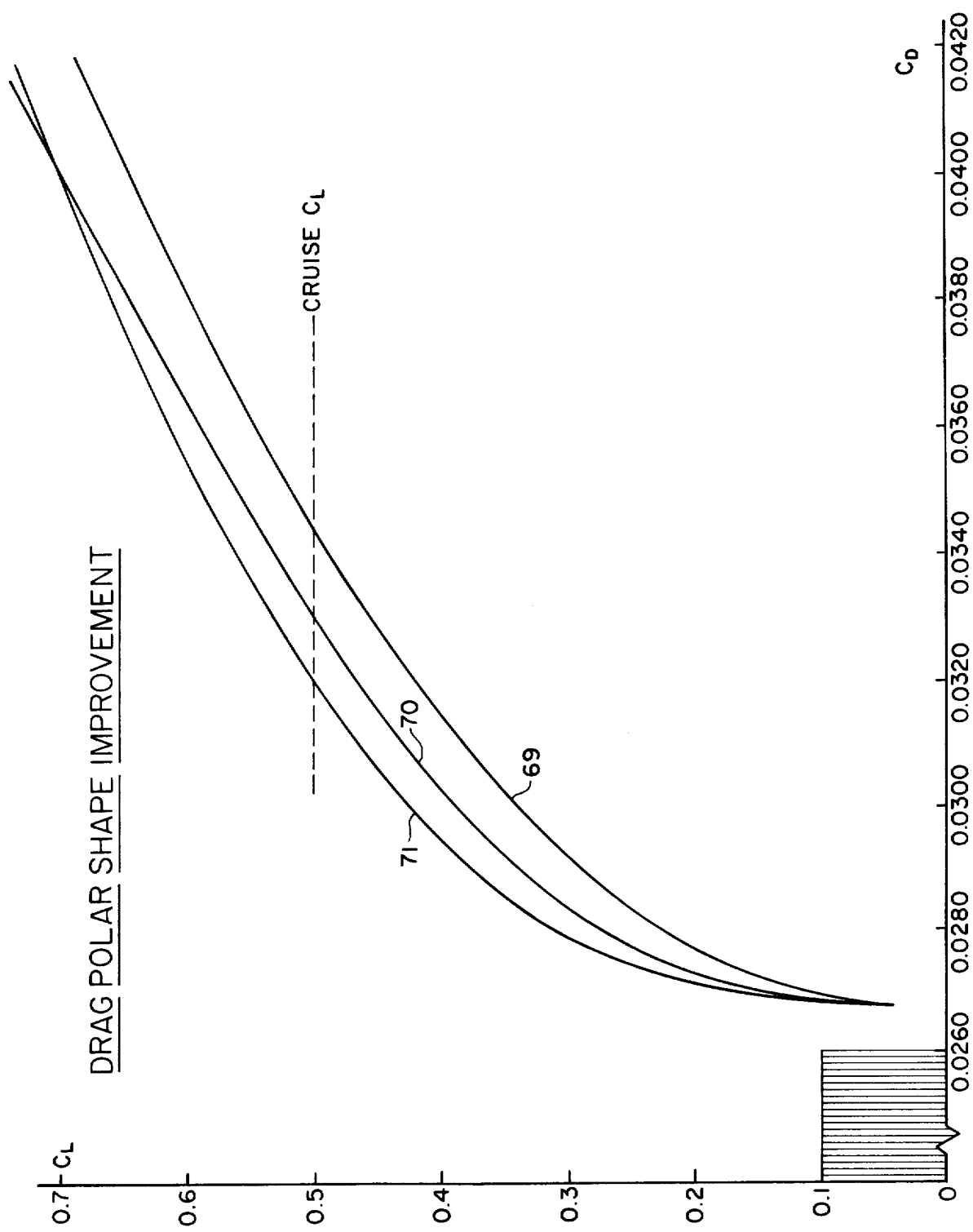
FIG. 10 is a plot of the drag polar shape improvement resulting from the crossflow capture means embodied in the invention.

Tests have been made of the invention in a low-speed wind tunnel. FIG. 10 is a graph with curve 69 showing polar plots of a basic wing, the same wing fitted with winglets (curve 70), and the basic wing fitted with the capture surface of the invention (curve 71). The capture surface tested had a radius approximately equal to the wing thickness at the tip and the wing was provided with means to aspirate the capture region. In the tests in which a 1/8.8 scale reflection plane model was used, a 0.01 lb/sec suction flow rate was maintained during the testing of the wing fitted with the capture surface. (The suction flow rate will, of course, be a function of the size of the aircraft or model under test.) The wing itself was of a supercritical section type with a high aspect ratio (AR=8.5). It is expected with this invention that, as the aspect ratio decreases, the performance of the device will improve since the wing tip will have a larger effect on the overall wing surface. As indicated graphically in FIG. 10, although there is some drag reduction with the winglet along (curve 70), the lift-induced drag at cruise conditions was reduced (curve 71) by the capture means of this invention (without the winglet) by approximately one-third of its original value.

It is of interest to note that when the same apparatus and test set-up was used but with capture surface 10 removed, which configuration substantially duplicates the designs disclosed in the prior art in which a suction is drawn on the wing tip to reduce vortex flow, the same suction on the wing tip used in the tests of the present invention had no effect on the aerodynamic characteristics of the aircraft. It is conjectured that such prior art designs are ineffective because the cross-flow has already separated in the region of flow removal. The "dead" air removed from this eddy region thus has little effect on the global wing flow. When the same tests were run with only a portion of capture surface removed, which would simulate a drooped tip wing, a small end plating effect was observed, but the suction or flow removal effect of the capture surface of the invention was lost.

In the description of the invention in the drawings, the crossflow capture means is shown for only a single wing tip on one side of the aircraft, it will be appreciated that the construction of the other wing tip is a mirror image of the one shown and is symmetrical relative to the axis of the aircraft.

Although shown and described in what are believed to be the most practical and preferred embodiments, it is apparent that departures from the specific methods and apparatus described will suggest themselves to those skilled in the art and may be made without departing from the spirit and scope of the invention. We, therefore, do not wish to restrict ourselves to the particular instrumentalities illustrated and described, but desire to avail ourselves of all modifications that may fall within the compass of the appended claims.

Having thus described our invention, what we claim is:

1. In a fluid foil having a span with a root at one end and a tip at the other end thereof, said foil generating lift when moved with relative motion through a fluid, said motion inducing variations in pressure on said foil with the tip end producing an associated drag-inducing vortex flow therearound due to the crossflow moving outwardly with respect to the root from the higher pressure surface of the foil toward the lower pressure surface thereof, the improvement comprising, in combination, crossflow capture means at said foil tip, said capture means having a flow intercepting surface comprising a curved capture surface extending at least across the chord of said foil tip and from the upper surface of said foil to below the lower surface thereof, the lower edge of said surface extending inboard of said foil tip, with the concave side of said capture surface facing said foil root and forming a crossflow capture inlet, and aspirating means for removing crossflow captured by said capture surface for venting at a location away from said capture flow inlet, said aspirating means consisting of a fluid stub foil fixedly mounted on the tip of the fluid foil on the low pressure surface side thereof, the flow of fluid over said foil and stub foil generating regions of higher and lower pressures on the surfaces thereof, a slot in said stub foil surface opening on to a low pressure region thereof, a fluid passageway connecting said slot to the crossflow capture inlet such that said slot aspirates the crossflow intercepted by the curved capture surface whereby the crossflow intercepted and removed by said capture and aspirating means weakens the tip vortex core strength to thereby reduce lift-induced drag on said fluid foil.

2. The foil tip flow control system of claim 1 wherein the fluid foil is a wing and the stub foil is a winglet.

3. The foil tip flow control system of claim 2 wherein the capture surface has an arcuate section the radius of the arc of which is approximately equal to the thickness of the wing at its tip.

4. The foil tip flow control system of claim 1 wherein the foil has a span with a center section and a tip at either end thereof, and wherein crossflow capture means are provided at each foil tip, the concave side of the capture surface at each tip facing said center section.

* * * * *